Figure 1:
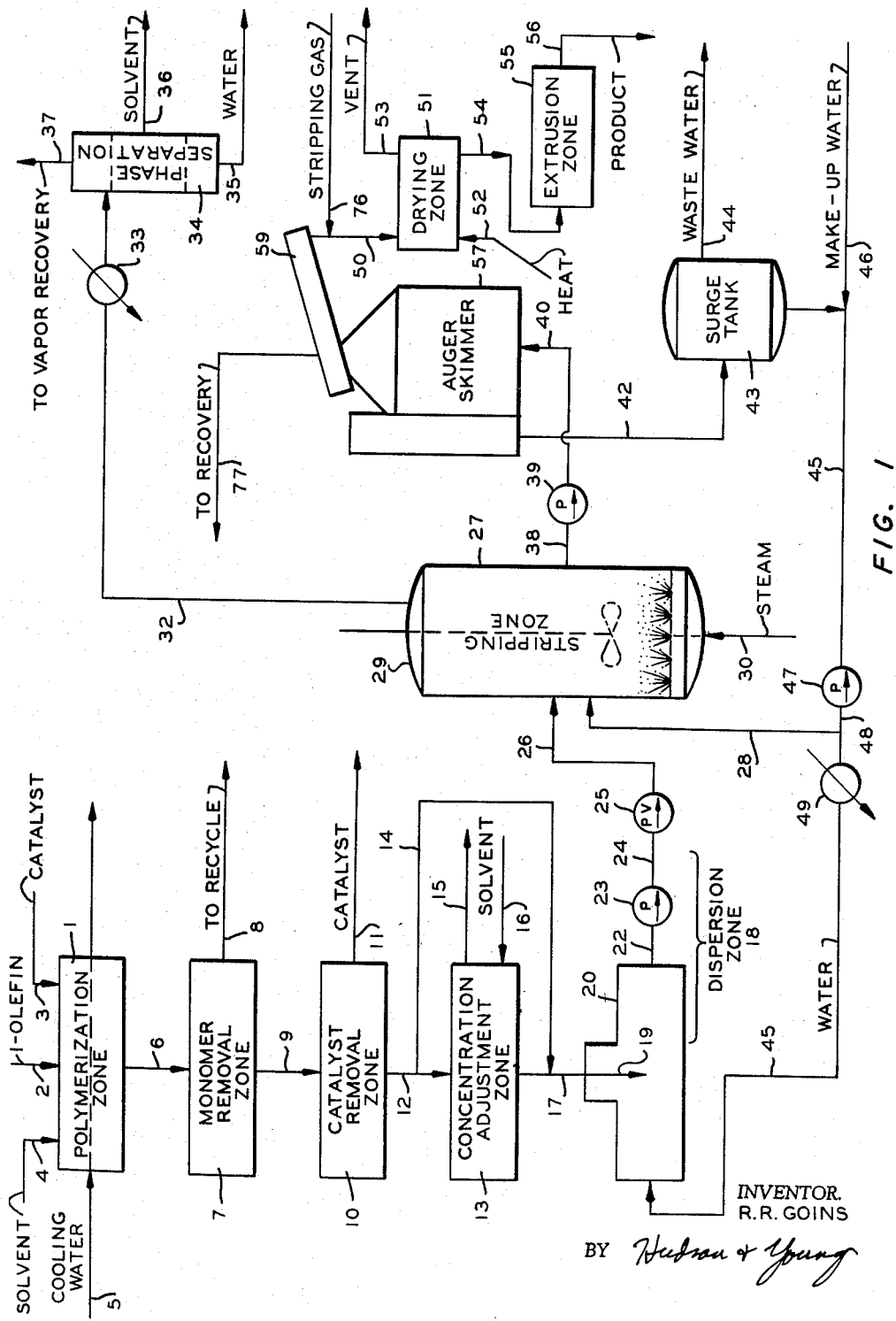

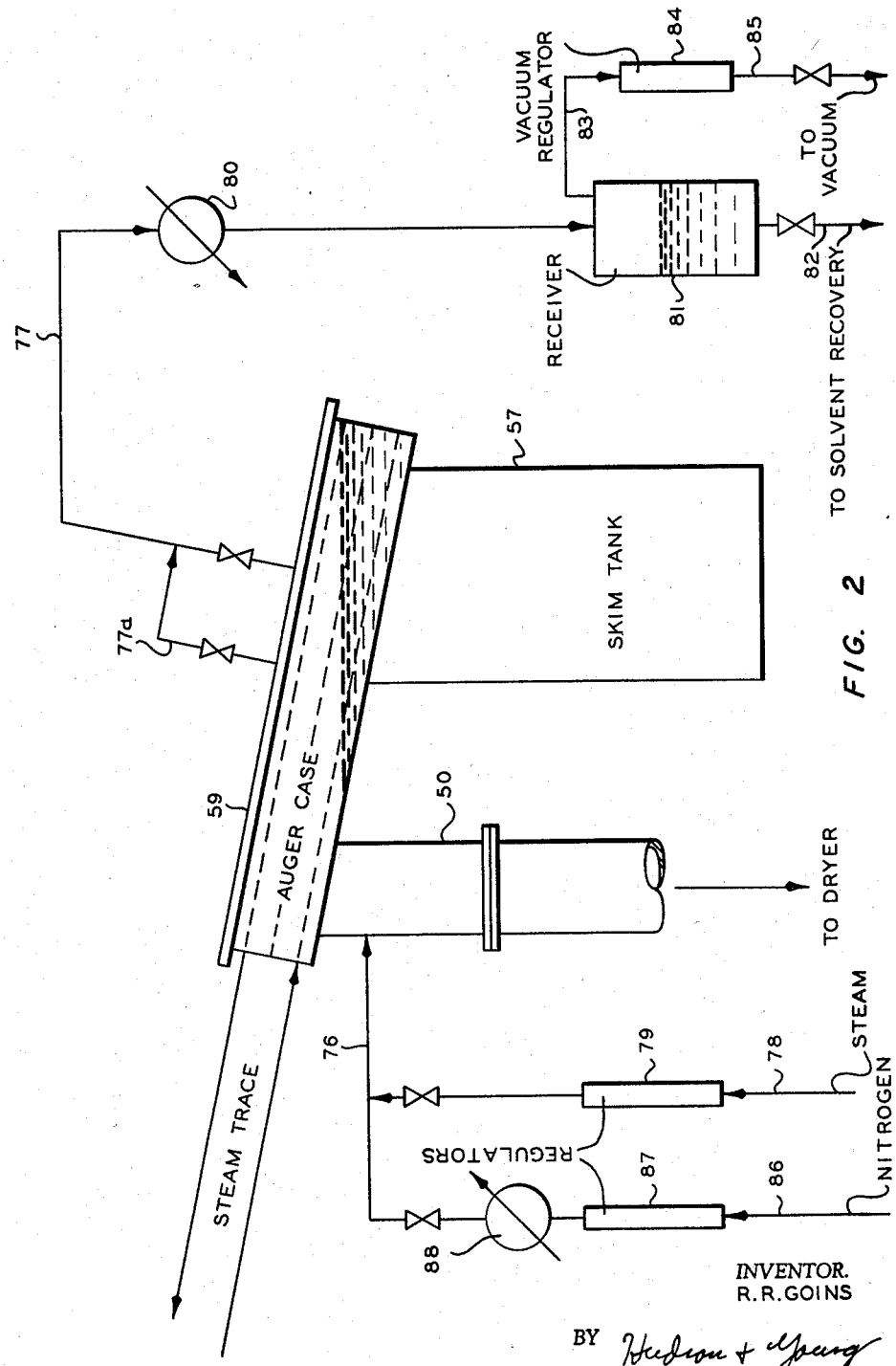

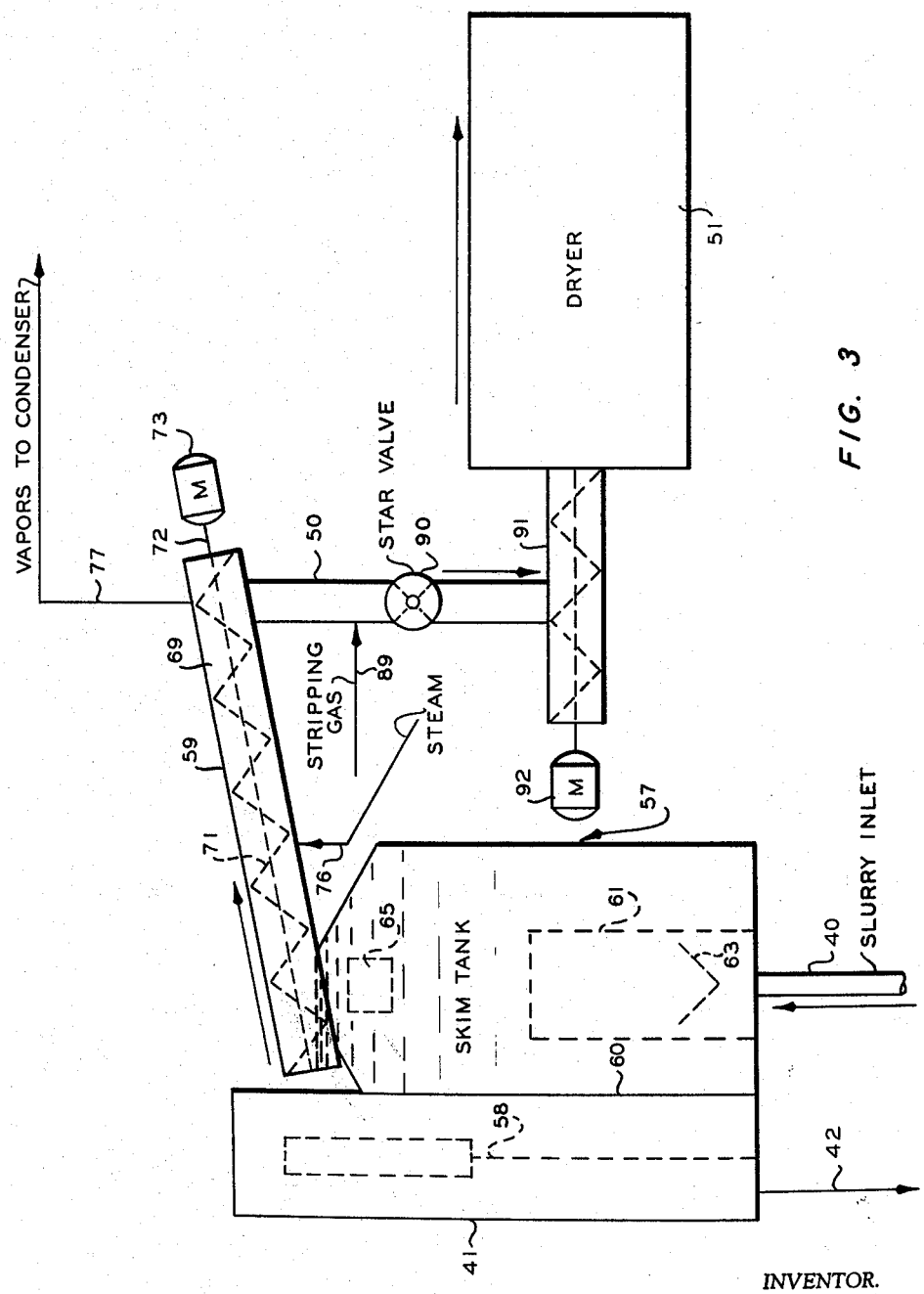

United States Patent Office 2,957,861
Patented Oct. 25, 1960

2,957,861

PROCESS AND APPARATUS FOR THE STRIPPING OF POLYMER SOLIDS IN SKIMMER SYSTEM

Robert R. Goins, Bartlesville, Okla., assignor to Phillips Petroleum Company, a corporation of Delaware Filed Dec. 2, 1957, Ser. No. 700,141

9 Claims. (Cl. 260—94.9)

This invention relates to separation of solids from liquid. In one of its aspects, this invention relates to stripping vapors and low boiling liquid from solids in an auger. In a more limited aspect, this invention relates to removal of hydrocarbon from polymer removed from a skimmer by means of an auger.

As used herein the term "floatable solids" is intended to mean solids which are capable of being separated from liquid by flotation.

In many processes in which finely divided solids are handled, it becomes necessary to separate the solids from a liquid. An example is in the preparation of solid polymers, such as polymers of olefins. In certain methods of preparing solid olefin polymers, the reaction product is obtained as a solution of polymer in a solvent or diluent material. Since the major uses of the polymer require a solid product, it is desirable that the polymer be separated from the solvent material, such as by precipitation methods. In one method which is described in detail in a copending application of R. G. Wallace, Serial No. 584,812, filed May 14, 1956, now abandoned, a slurry of precipitated polymer in solvent is provided by spraying a solution of polymer into liquid water whereby the polymer is dispersed in the water as particles and removed from the solution. This operation is carried out by combining the water at a temperature between about 60° F. and about 110° F. with a polymer solution having temperature between about 350° F. and about 200° F. to provide a mixture of polymer, water and solvent having a temperature between about 110° F. and about 150° F. Usually the amount of water required is between 1 and about 5 lbs./lb. of polymer solution. Sufficient pressure is required during the process to maintain the solvent and water in liquid state. After the precipitation step the polymer is present in a sub-divided solid form, mixed with water and solvent. A major portion of the solvent can be removed by stripping, however, the problem still remains of separating the water whereby a dry polymer product can be obtained.

In the copending application of Leatherman and Detter, Serial No. 590,567, filed June 11, 1956, a process is described wherein the polymerization of 1-olefins is carried out in a diluent such as pentane in the presence of a chromium oxide catalyst containing at least a portion of the chromium in the hexavalent state and this oxide is associated with at least one porous oxide selected from the group consisting of alumina, silica, and thoria.

In my copending application filed November 19, 1956, having Serial Number 623,075 a method and apparatus are described for removing a floatable solid from a skim tank by means of an auger, that is, a solid-liquid mixture is raised upwardly along an inclined surface while simultaneously providing a degree of agitation and tumbling of the solids. In one embodiment of that invention the solids-liquid mixture to be separated is introduced to a skimming tank superposed by an inclined auger, which at its end of lower elevation is in open communication with the skimming tank. The skimming tank is carried liquid full whereby all of the solids introduced thereto are readily taken up by the auger and are discharged at the end of high elevation. Due to the density of the solids, the elevation of the auger and the tumbling effect provided during passage of the solids through the auger, the concentration of solids in the mixture leaving the auger is substantially increased. As desired additional drying can be provided by discharging the concentrated solids mixture to a secondary dryer, such as for example, a rotary steam dryer, air dryer, etc.

While the above described method aids materially in removing excess liquid from the solids, in those systems wherein a slurry of solids in a low boiling liquid such as polymer in hydrocarbon are first steam stripped prior to being passed to the skim tank, a small amount of said low boiling material remains with the solids, the amount being somewhat dependent upon the temperature of the stripping zone. Frequently the stripping zone is limited as to the maximum temperature such as for example the softening point or decomposition temperature of the solids, steam temperature and the like. These low boiling materials are frequently hazardous to health and are fire hazards in conventional drying equipment. For that reason, it is often desirable to reduce the concentration of such materials to a minimum. It is also desirable to remove these materials prior to the final drying step to aid in the recovery of these materials and to reduce the load on the dryer.

It is an object of this invention to provide a method and apparatus for removing additional liquid from solids in an auger.

It is another object of this invention to provide a method and apparatus for removing residual low boiling materials from solids recovered from a skim tank by means of an auger.

It is still another object of this invention to remove residual hydrocarbon from a polyolefin recovered from hydrocarbon slurry by steam stripping.

Still other objects, features and advantages of this invention will be obvious to those skilled in the art having been given this disclosure.

The foregoing objects are achieved broadly by contacting the solids while being transported upwardly in a confined zone with a stripping gas. Preferably the stripping gas will be passed countercurrent to the moving particles and more preferably the stripping gas is steam.

The method and apparatus of this invention can be used in general for removing residual low boiling materials from solids which have been separated from liquid by use of an auger and is particularly useful for reducing the hydrocarbon from polymers by steam stripping and separated from water in a skim tank.

The invention will be described in conjunction with an olefin polymerization process and recovery system, however, this is not intended in any way to limit the scope of the invention which includes the reduction of low boiling content from solids in general.

Solid olefin polymers are prepared usually by contacting the olefin to be polymerized with a catalyst at an televated temperature and pressure, often in the presence of a solvent or diluent material. The reaction product can be one of a wide variety of olefin polymers, such as for example, polymers or copolymers of monoolefins like ethylene, propylene, butylene, etc., also copolymers of these monoolefins and diolefins such as butadiene, isoprene, etc.

The temperature required for polymerizing olefins varies over a wide range. However, usually it is preferred to carry out the reaction at a temperature between about 150° F. and about 450° F. The particular temperature to be employed in each individual case depends on the catalyst used, the olefin to be polymerized and the operating conditions employed, such as pressure, space velocity, diluent to olefin ratio, etc.

The polymerization pressure is often maintained at a sufficient level to assure a liquid phase reaction, that is at least about 100 to 300 p.s.i.g., depending upon the type of feed material and the polymerization temperature. Higher pressures up to 500 to 700 p.s.i.g. or higher can be used, if desired. When utilizing a fixed catalyst bed, the space velocity varies from as low as about 0.1 to about 20 volumes of feed per volume of catalyst per hour, with the preferred range between about 1 and about 6 volumes per volume per hour. The polymerization process can also be carried out in the presence of a mobile catalyst. In this type of operation the catalyst concentration in the reaction zone is maintained between about 0.01 and about 10 percent by weight and the residence time is from 10 minutes or less to 10 hours or more.

A preferred polymerization method is described in detail in a copending application of Hogan and Banks, Serial No. 573,877, filed March 26, 1956, now Patent No. 2,825,721. This particular method utilizes a chromium oxide catalyst, preferably containing hexavalent chromium, with silica, alumina, silica-alumina, zirconia, thoria, etc. In one embodiment of this application, olefins are polymerized in the presence of a hydrocarbon diluent, for example an acyclic, alicyclic or aromatic compound which is inert and in which the formed polymer is soluble. The reaction is ordinarily carried out at a temperature between about 150° F. and about 450° F. and usually under a pressure sufficient to maintain the reactant and diluent in the liquid state. The polymers produced by this method, particularly the polymers of ethylene, are characterized by having an unsaturation which is principally either trans-internal or terminal vinyl, depending on the particular process conditions employed. When low reaction temperatures, about 150° F. to about 320° F., and a mobile catalyst are used for polymerization, the product polymer is predominantly terminal vinyl in structure. When polymerization is carried out at higher temperatures and in a fixed catalyst bed, the polymer has predominantly trans-internal unsaturation. Polymers prepared by both methods are also characterized by their high densities and high percentage of crystallinity, usually greater than 90% at normal atmospheric temperatures.

Other less advantageous and nonequivalent procedures which employ different catalysts are also used for preparing olefin polymers. For example, polymers are prepared in the presence of organo-metallic compounds such as triethyl aluminum plus titanium tetrachloride, mixtures of ethylaluminum halides with titanium tetrachloride, and the like. Another group of catalysts which is used comprises a halide of a Group IV metal such as, for example, titanium tetrachloride, silicon tetrabromide, zirconium tetrachloride, tin tetrabromide, etc., with one or more free metals selected from the group consisting of sodium, potassium, lithium, rubidium, zinc, cadmium and aluminum.

The solvent or diluent employed in the polymerization reaction includes in general, paraffins which can at least partially dissolve the polymers at the temperature employed in the reaction zone. Among the more useful solvents are paraffins having between about 3 and about 12 carbon atoms per molecule, such as, for example, propane, isobutane, n-pentane, isopentane, isooctane, etc., and preferably those paraffins having 5 to 12 carbon atoms per molecule. Also useful in the polymerization reaction are alicyclic hydrocarbons, such as cyclohexane, methylcylohexane, etc. Aromatic diluents are also used, however, in some instances they (or impurities therein) tend to shorten the catalyst life, therefore, their use will depend on catalyst life. All of the foregoing and in addition other hydrocarbon diluents which are relatively inert and in the liquid state at the reaction conditions may also be employed in carrying out the reaction of olefins to form solid polymers.

It is apparent from the preceding discussion that the solid polymers prepared by the aforedescribed methods are present in the reaction effluent as a solution of polymer in a solvent or diluent. Inasmuch as the major uses of the polymers require a solid product, it is desirable that the polymer be separated from the solvent material. Several methods have been proposed for treating the polymer solution to accomplish this purpose. In one method, the polymer solution is sprayed into liquid water whereby the polymer is dispersed in the water and removed from solution. This process is described in detail in a copending application of R. G. Wallace, Serial No. 584,812, filed May 14, 1956.

As a result of the foregoing treatment the polymer product is obtained as a slurry of subdivided solids in a mixture of water and solvent. To obtain the desired dry product the slurry is treated first for the removal of the major portion of the solvent and then for the removal of the major portion of the water. In one method, solvent removal is effected by steam distillation following which a large proportion of the water is removed in a skimming operation. In my above identified copending application, the polymer is removed from the skimming operation by means of an auger.

The apparatus of this invention and the operation thereof are best described by reference to the attached drawings of which, Figure 1 is a diagrammatic illustration of an olefin polymerization process and associated recovery equipment, Figure 2 is a diagrammatic illustration of the auger and stripping gas flow and, Figure 3 is a diagrammatic illustration of an alternative stripping gas flow to an auger and associated apparatus.

Referring now to the drawings, a feed stream consisting essentially of the polymerizable monoolefins, ethylene for example, is passed to polymerization zone 1 via conduit 2. A chromium oxide catalyst, containing hexavalent chromimum, associated with silica-alumina is introduced to said polymerization zone via conduit 3. The catalyst is usually dispersed in at least a portion of the solvent. Any additional solvent (cyclohexane) is added to polymerization zone 1 via conduit 4. The ingredients in each of these conduits 2, 3 and 4 are preferably at polymerization temperatures (230–300° F.), however, one or more streams can be cooler with remaining streams warmer so that the resulting dispersion is at the proper temperature. It should also be understood that the monoolefin and solvent can be premixed, if desired. The polymerization reaction is exothermic so that it is necessary to remove heat from the polymerization zone. This can be accomplished by indirect heat exchange, for example, cooling water in conduit 5. The polymerization zone effluent, at about 280° F. from zone 1 passes via conduit 6 to monomer removal zone 7 wherein unreacted ethylene is vaporized and removed via conduit 8 to ethylene recycle and any undissolved polymer is dissolved by heating, additional solvent being added as desired. The mixture passes from monomer removal zone 7 via conduit 9 to catalyst removal zone 10 wherein the solution and catalyst are separated. The catalyst is removed via conduit 11. The polymer solution is passed from separation zone 10 via conduit 12. In general, the polymer concentration in conduit 12 is low and solvent is removed from zone 13 via conduit 15. On the other hand, if the concentration is high, solvent can be added via conduit 16. The solution is cooled in this zone, either by evaporation or by cool solvent to about 240° F. The polymer concentration is adjusted to about 4.5 percent polymer in this example. In any case, the solution is passed to dispersion zone 18 wherein the polymer solution is dispersed in water of lower temperature so as to cause polymer to precipitate under such conditions that both the water and solvent remain as liquid phases. In this embodiment, the solution passes from conduit 17 through nozzle 19 into a stream of water in pipe tee 20. Nozzle 19 is positioned in said tee so as to disperse the solution into the water stream. Water at about 100° F. enters tee 20 via conduit 45. The resulting dispersion passes through conduit 22 to centrifugal pump 23. Dispersion by spray nozzle is preferred but other dispersion means such as colloid mill, mixing tee, combination of these means, and the like can also be used. Sufficient water is admixed with the solution to provide a resulting temperature in the range of 100 to 130° F., and preferably about 120° F. The resulting dispersion passes via conduit 24 to pressure reducing valve 25 which holds the desired pressure on the dispersion zone, in this case about 35 to 45 pounds per square inch gauge. It will be understood by those skilled in the art that other pressure reducing means can be used, e.g., sufficient length of pipe, an orifice and the like. The material passes through line 26 directly to the stripping zone 27. The stripping zone can be operated at any desired temperature and pressure so long as solvent is vaporized. Preferably, the stripper will operate at atmospheric pressure and at about 170° F., however, under vacuum, the temperature will be lower, e.g., 140° F. for 7 p.s.i.a. Since the polymer is lighter than water and will float, an agitator 29 is provided to maintain the solids in dispersion. This agitator is rotated at a speed preferably in the range of 25 to 200 r.p.m. and in this example at about 85 r.p.m. While any means of supplying heat in the stripping zone can be used, steam is especially effective. Steam from conduit 30 is supplied to the steam stripper via steam nozzle 31.

Steam and solvent vapor pass overhead from stripping zone 27 via conduit 32 to condenser 33, where most of the vapors are condensed and then passed to separation zone 34. The solvent and water form two layers in this zone 34 and water is removed via conduit 35 while solvent is removed via conduit 36. Non-condensibles and uncondensed vapor pass overhead from zone 34 via conduit 37. The polymer residence time in this stripping zone is in the range of 20 to 30 minutes.

A mixture of polymer solids and water with a small amount of solvent is removed from the stripping zone 27 to conduit 38 and pump 39 and discharged through conduit 40 to skimming tank 57. This tank (see Fig. 3) comprises a first cylindrical section having a conical shaped top which is truncated by the lower terminus of inclined auger 59 and a second adjoining section 41 which has one wall 60 in common with a wall of the first section. The second section of the skimming tank is rectangular in cross-section and of a higher elevation than the first section. Within the second section there is an adjustable weir 58 which is sealed at the bottom and open at the top whereby water entering this section from the first section flows upwardly over the weir and out of the bottom of the second section through conduit 42. The second section is covered at the top with a loose fitting cover plate. Commmunication between the two sections is provided at the bottom of the common wall. Within the first section of the skimming tank there is provided a third cylindrical section 61 of smaller cross-section which encloses the slurry entry conduit 40. This section contains a diverter shield 63 and has walls which extend upwardly to a level above the top of the opening between the first and second sections of the skimming tank.

Inclined auger 59 comprises a barrel 69 which encloses a continuous screw or auger 71 having a shaft 72 extending through and supported by the closed ends of said barrel. Rotation of the auger is provided by motor 73. As previously stated the lower terminus of the auger assembly communicates with the top of the skimming tank. The upper terminus of the auger assembly communicates with outlet conduit 50. Preferably both termini and also conduit 50 have cross-sectional areas equal to or greater than the cross-sectional areas of barrel 69. This auger is preferably steam traced to provide heat for evaporation of solvent via steam trace conduit.

An inert stripping gas such as steam is admitted to the auger via conduit 76 and stripping gas plus solvent is removed via conduit 77. As has been indicated, it is preferred to introduce the stripping gas countercurrent to the flow of solids in the auger. This is shown in detail in Figure 2. Steam from conduit 78 passes through flow regulator 79 to conduit 76 and countercurrent through auger 59. The excess steam along with solvent is removed via conduit 77. Conduit 77a is provided for the removal of stripping gas and solvent should the water level in the auger be so high that some water is entrained in conduit 77. These gases flow to condenser 80 and the condensed material is collected in receiving vessel 81. The liquid is removed via conduit 82 to a separation zone, not shown, where solvent can be separated from water such as by phase separation. Non-condensibles and uncondensed vapor pass via conduit 83, vacuum regulator 84 and conduit 85 to vacuum source, not shown. Since it is desirable to maintain a slight flair to the vacuum source, nitrogen is introduced to the auger 59 along with steam via conduit 86, flow regulator 87, heat exchanger 88 and conduit 76. Also when it is desired to use only nitrogen as the stripping gas, it can be introduced via this route.

Figure 3 shows an alternative arrangement wherein the inlet conduit 76 and the outlet conduit 77 are at opposite ends of auger 59 so as to provide for concurrent flow. Frequently, it is desirable to contact the solids in auger 59 with one stripping gas, e.g. steam, and subsequently contacting the solids with a second gas, e.g., nitrogen. This can readily be accomplished as is also shown in Figure 3. The solids from auger 59, passing via conduit 50 to dryer 51 are contacted via a stripping gas admitted to conduit 50 via conduit 89. This gas flows upward through conduit 50 and is removed through conduit 77 along with solvent and vapors from the auger. Star valve 90 is provided to transfer the solids from conduit 50 to dryer feed 91. This feed is driven via motor 92 and introduces the solids to auger 51. Heat for dryer 51 is provided via conduit 52 and is vented via conduit 53. The dried polymer passes via conduit 54 to extrusion zone 55 wherein the polymer is melted, extruded into strands, cooled and chopped into pellets. These pellets are removed to product storage via conduit 56.

In the operation of this improvement, steam is the preferred stripping gas. The entering purge or stripping gas sweeps solvent vapor into the overhead system. A portion of the steam condenses on the polymer and aids in stripping the solvent. The solvent being stripped from the polymer will drive some water with it and the condensed water flows back into the skim tank and therefore the polymer is not only freed of solvent but is drier than when no stripping gas is employed. That is, the solvent removed is occluded or dissolved and the condensing water on the surface of the polymer causes this solvent to come out of the polymer. The surface water is readily removed in the dryer.

In the preferred method of operation, a small pressure is maintained in the auger preventing flow of gases from the dryer to the system. By so operating, star valve 90 is not required.

The preceding discussion and description have been directed to a preferred embodiment of the invention, however, this is not intended in any way to limit the scope of the invention. Thus, although in the preceding discussion the skimmer tank has been described as having a conical shaped top, it is within the scope of the invention to use other shapes, including an inverted V top having vertical sides or a multisided top, such as a pyramid, wherein each wall slopes. When utilizing a conical top the slope of the cone is preferably not less than about 30 degrees measured from the horizontal. The same minimum slope has been found effective with an inverted V top, however, when a pyramid top is used, it is desirable to increase the minimum slope to about 40 to 50 degrees, since the latter slope provides a less efficient operation.

It is also within the scope of the invention to use in place of the single auger shown in the drawing, a double auger wherein the auger flights intermesh, thereby giving substantially positive displacement. With this type of apparatus the maximum inclination of the auger can be increased substantially above 30 degrees.

Again, it is within the scope of the invention to provide means other than an auger for separating the solids and liquids. Thus, for example, the barrel 69 can contain a continuous conveyor of the bucket or similar type, adapted to agitate and tumble the solids as they pass upwardly from the skimming tank.

EXAMPLES

A solid ethylene polymer was prepared in a reactor in the presence of a chromium oxide catalyst, containing hexavalent chromium, having a composition of about 2.5 weight percent chromium of which about 2.2 weight percent was hexavalent chromium, associated with silica-alumina prepared by impregnating said silica-alumina with chromium trioxide solution followed by drying and activating in dry air for several hours at temperatures up to 950° F.

The reactor effluent was processed in a series of operations corresponding to those shown in Figure 1 of the drawing including unreacted ethylene removal, catalyst removal, effluent concentration, precipitation of the polymer in water, stripping of the precipitated slurry to remove solvent and separating polymer from water in a skim tank as shown in Figure 2 of the drawings.

The skim tank comprises a 55 gallon drum having a 45 degree conical top fabricated from sheet aluminum, truncated by a barrel conveyor inclined at an angle of 20 degrees to the horizontal and containing a stainless steel auger driven by a gear head motor through a V-belt. The barrel was constructed of 4" schedule 40 aluminum pipe (inner diameter 4.026") and the auger contained a single helix with eleven turns having a diameter of 3.5" and a pitch of approximately 1.1. The overall length of the barrel was 51.5" and the polymer outlet was constructed of 4" schedule 40 aluminum pipe. The feed to the skimmer was at the rate of 9,624 pounds per hour comprising 0.25 weight percent solids. The skimmer operated at substantially atmospheric pressure and the auger speed was approximately 22 revolutions per minute.

EXAMPLE I

Several runs were made utilizing the conditions described above and at various steam stripper (27) temperatures. The data obtained are given in Table I:

Table I

| Stripper Temperature | Steam Rate to Auger,[1] Lb./Lb. of Dry Polymer | Solvent Recovered By Auger Stripping, Lb./Lb. Dry Polymer | Residual Solvent, Lb./Lb. Dry Polymer |
| --- | --- | --- | --- |
| 170 | 0.6 | 0.3 | |
| 175 | 0.3 | 0.07 | 0.001 |
| 180 | 0.3 | 0.045 | 0.005 |
| 190 | 0.6 | 0.022 | |

[1] 0.5 s.c.f.m. of nitrogen also introduced to auger.

From the above data, it can be seen that the amount of solvent recovered by means of auger stripping is material.

EXAMPLE II

A series of runs was made as described above and the initial solvent content of the skimmer product determined. A record set of runs were made wherein the auger stripping of this invention was employed utilizing either nitrogen or steam. In the case of steam as stripping gas, 0.5 s.c.f.m. of nitrogen was also employed. The data are plotted in Table II.

Table II
OPERATING SUMMARY FOR SOLVENT STRIPPING THE AUGER SKIMMER PRODUCT

| Run | Temp. | Nitrogen/Steam Rate | Polymer Rate, Lb./Hr. | Condensate, g. p. h. | | Ratio Solv./ Water, Lb./Lb. | Percent Recovery[1] | Percent Initial Solvent Content[1] (Fig. II) | Percent Calculated Residual Solvent Content[1] | Percent Actual Residual Solvent Content[1] | Length of Run, Hr. |
| --- | --- | --- | --- | --- | --- | --- | --- | --- | --- | --- | --- |
| | | | | Solvent | Water | | | | | | |
| 1 | 175 | N, 1 s.c.f.m. | 80 | .61 | .01 | 46 | 4.8 | 9.4 | 4.6 | | 4 |
| 2 | 175 | N, 2 s.c.f.m. | 68 | .22 | .10 | 1.6 | 2.0 | 9.4 | 7.4 | | 1.5 |
| 3 | 175 | N, 1 s.c.f.m. | 60 | .35 | | | 3.7 | 9.4 | 5.7 | | 1 |
| 4a | 175 | N, 0.5 s.c.f.m. | 62 | .56 | .43 | 1.0 | 5.7 | 9.4 | 3.7 | | 2 |
| 4b | 176 | N, 0.6 s.c.f.m. | 72 | .60 | .05 | 9.1 | 5.3 | 8.0 | 2.7 | | 1 |
| 4c | 176 | N, 0.7 s.c.f.m. | 74 | .55 | .26 | 1.6 | 4.7 | 8.0 | 3.3 | | 3 |
| 5 | 171 | N, 15 s.c.f.m. | 46 | .68 | .13 | 3.9 | 9.4 | 21.0 | 11.6 | 12.0 | 4 |
| 6 | 180 | N, 1 s.c.f.m. | 60 | .26 | .06 | 3.3 | 2.8 | 4.2 | 1.4 | | 7 |
| 7 | 191 | Steam, 37 Lb./Hr. | 56 | .24 | 3.2 | .06 | 2.7 | 1.5 | (2) | .17 | 1.5 |
| 8a | 170 | Steam, 37 Lb./Hr. | 56 | 2.24 | 2.4 | 0.7 | 26.0 | 27.0 | 11.0 | | 1 |
| 8b | 170 | Steam, 56 Lb./Hr. | 56 | 2.68 | 3.8 | 0.7 | 30.2 | 27.0 | (2) | | 7 |
| 9 | 176 | Steam, 18, 37, 56 Lb./Hr. | 61 | .75 | 1.9 | 0.3 | 7.8 | 8.0 | 0.2 | | 7 |
| 10 | 180 | Steam, 18 Lb./Hr. | 55 | .38 | .93 | 0.3 | 4.4 | 4.3 | (2) | | 2 |
| 11 | 175 | Steam, 18 Lb./Hr. | 50 | .74 | .80 | 0.7 | 9.4 | 9.4 | 0.0 | | 23 |
| 12 | 175 | Steam, 18 Lb./Hr. | 65 | .76 | .75 | 0.7 | 7.4 | 9.4 | 2.0 | 1.4 | |

[1] Based on dry polymer.
[2] Values were not recorded as they would be less than 0.0 percent.

NOTE.—Operating Conditions:
1. Case steam temperature, 220 F.–230 F.
2. Overhead temperature—Steam, 200–215 F.—Nitrogen, 140–155 F.

From Table II it can be seen that either nitrogen or steam is effective in reducing the residual solvent content of the polymer and that steam is superior to the inert gas.

I claim:
1. In a process for recovering solid polymer of 1-olefin from a dispersion of same in a low boiling liquid hydrocarbon wherein said dispersion in admixture with water is passed to a steam stripping zone with the bulk of the hydrocarbon present and steam stripped leaving a slurry of said polymer in water and said slurry is confined in a skimming zone wherein said polymer rises to the surface and is skimmed off into a second confined zone in which said polymer is conveyed up an inclined surface with a tumbling action and thereafter discharged into a drying zone, the improvement which comprises contacting said polymer solids in said second confined zone during said conveying action with a stripping gas to remove residual liquid hydrocarbon at a temperature above the vaporization temperature of said liquid hydrocarbon, thereby removing residual liquid hydrocarbon from said polymer.

2. The process of claim 1 wherein the moving solid is contacted in said second confined zone with a countercurrent moving stream of stripping gas.

3. The process of claim 2 wherein said solid polymer is polyethylene.

4. The process of claim 3 wherein said stripping gas is nitrogen.

5. The process of claim 3 wherein said stripping gas is predominantly steam.

6. An apparatus comprising in combination a confined skimming tank adapted to hold a liquid and a floatable solid, means for introducing a liquid and floatable solid to said tank, means for withdrawing liquid from said tank, inclined auger means having a lower terminus openly communicating with the top of the skimmer and an upper terminus, a vertical conduit in open-communication with and depending from said upper terminus, means for maintaining a liquid level above the lower terminus of said auger means, drive means for actuating said auger means, means for introducing a gas to said auger means, means for introducing a gas to said vertical conduit below the said upper terminus of said auger means, and means for withdrawing vapors from said auger means.

7. The apparatus of claim 6 wherein the means for introducing a gas to said auger means is in the lower portion thereof and the means for withdrawing vapors from said auger means is in an upper portion thereof.

8. The apparatus of claim 6 wherein the means for introducing a gas to said auger means is in the upper portion thereof and the means for withdrawing vapors from said auger means is in the lower portion thereof.

9. An apparatus comprising in combination a confined skimming tank adapted to hold a liquid and a floatable solid, means for introducing a liquid and floatable solid to said tank, means for withdrawing liquid from said tank, inclined auger means having a lower terminus openly communicating with the top of the skimming tank, means for maintaining a liquid level above the lower terminus of said auger means, drive means for actuating said auger means, means for introducing a gas to said auger means, and means for withdrawing vapors from said auger means.

References Cited in the file of this patent

UNITED STATES PATENTS

| | | |
|---|---|---|
| 1,648,607 | Brown | Nov. 8, 1927 |
| 2,838,477 | Roelen et al. | June 10, 1958 |